United States Patent
Barthold et al.

[15] 3,662,261
[45] May 9, 1972

[54] AUTOMATIC FREQUENCY METER

[72] Inventors: Roy R. Barthold, Los Altos; William J. Keane, San Jose; Lawrence F. Miller, Saratoga, all of Calif.

[73] Assignee: EIP Labs, Santa Clara, Calif.

[22] Filed: June 3, 1969

[21] Appl. No.: 829,899

[52] U.S. Cl. ...................... 324/78 R, 324/0.5 R, 333/73 C
[51] Int. Cl. ......................................................... G01r 23/02
[58] Field of Search ................... 324/0.5, 78; 333/24, 24.2, 333/73

[56] References Cited

UNITED STATES PATENTS 3,374,436  3/1968  Thiess ............................. 324/0.5 UX
3,541,444  11/1970  Mandel ............................... 324/78

Primary Examiner—Michael J. Lynch
Attorney—Limbach, Limbach & Sutton

[57] ABSTRACT

An automatic frequency meter is disclosed including a resonant frequency structure coupled to a transmission line with the frequency of the resonant structure continuously swept and change in level of the signal on the transmission line detected for a determination of the resonant frequency of the structure and therefore the frequency of the signal. The resonant frequency structure can be YIG coupled to the transmission line in an absorbtion mode. The YIG can be coupled to the line by positioning adjacent a slot in the center conductor with the slot aligned parallel to the magnetic field for coupling to the 210 mode or perpendicular to the magnetic field for coupling to the 110 mode of the YIG.

5 Claims, 8 Drawing Figures

INVENTORS
ROY R. BARTHOLD
WILLIAM J. KEANE
LAWRENCE F. MILLER
BY Limbach & Limbach
ATTORNEYS

INVENTORS
ROY R. BARTHOLD
WILLIAM J. KEANE
LAWRENCE F. MILLER

BY *Limbach and Limbach*
ATTORNEYS

AUTOMATIC FREQUENCY METER

The present invention is directed in general to automatic frequency meters and more particularly to method and apparatus for providing direct digital read-out of the frequency of a signal to be measured.

Because of new military and commercial applications for radio frequency transmissions, the allocation of frequency is being very closely controlled to prevent interference. Thus, the problems of accurately and quickly measuring frequencies are an essential part of all military and commercial communication, radar, navigation and guidance systems.

The several methods presently being used for frequency measurements can be categorized as either analog techniques or digital techniques. While lower in cost, the analog techniques provide lower accuracy and require manual tuning. The digital techniques provide the ultimate in accuracy and require very little tuning but are quite expensive.

The analog techniques fall primarily into three categories. The first category includes manual tuning of a transmission cavity which passes only the desired frequency, and this cavity is generally calibrated to read frequency directly on a slide scale or tape. The second category includes manual tuning of an absorbtion cavity which absorbs a small portion of the desired signal and whose output dip is detected by means of a power meter or diode detector, and again, the cavity is generally calibrated to read frequency directly on a slide scale or tape. The third category includes manual tuning of a low frequency oscillator whose output is mixed with the desired signal until an audio tone is detected. Knowing the frequency range of the desired signal, the harmonic of the low frequency oscillator can be obtained, and the frequency of the desired signal is the harmonic number times the low frequency oscillation setting. The oscillator is usually calibrated with a dial, tape or slide scale.

The digital techniques revolve primarily around a digital counter which directly measures the cycles of the radio frequency carrier over some predetermined sample time. The digital techniques which also require manual frequency tuning include hetrodyne conversion techniques where the input signal these is mixed with a prefixed oscillator signal of known frequency so that the output signal falls in the range of the counter where it can be measured directly. Alternatively, a transfer oscillator technique can be employed similar to the analog type low frequency oscillator except that the oscillator frequency is measured directly in the counter rather than from a tuning dial. However, it still requires several manual manipulations to determine which harmonic of the oscillator is mixing with the desired frequency. In these digital techniques, the accuracy of the technique is usually better than 1 part in $10^8$ since both the counter and the prefixed oxcillator are fixed by a crystal controlled clock.

For completely automatic read-out of frequency without any manual tuning requirements, there are two devices currently available. One device available from System-Donner Corp. is basically a transfer oscillator in which the low frequency oscillator is electronically, rather than manually, tuned before being measured with a counter. The other device made by Hewlett- Packard Company is basically a double transfer oscillator device whereby the input signal is successively mixed with two low frequency oscillators before being counted. While these devices are extremely accurate, they are also extremely expensive.

The object of the present invention is to provide an automatic frequency meter and metering method combining accurate and convenient frequency readings at a lower overal cost than currently available.

Broadly stated, the present invention to be described in greater detail below is directed to an automatic frequency meter utilizing a transmission line carrying the signal to be measured, a resonant frequency structure, means for continuously sweeping the resonant frequency of the structure across a band of frequencies, means for coupling the frequency to the transmission line, means for detecting a change in the level of the signal from the transmission line, means for determining the resonant frequency of the structure from the sweeping means with a detected change in the output signal and means for indicating the frequency of the input signal corresponding to the determined resonant frequency. Typically, the resonant frequency structure is a yttrium-iron-garnet (YIG) member which can also be selectively doped, and the frequency is swept by applying a changing magnetic field to the YIG.

In accordance with another aspect of the present invention, the coupling of the YIG material to the transmission line is accomplished by positioning of the YIG at a slot in the center conductor of a coaxial transmission line and wherein the slot is arranged parallel to the direction of the magnetic field for coupling to the 210 mode of the YIG or perpendicular to the direction of the magnetic field for coupling to the 110 mode of the YIG.

Other objects and advantages of this invention will become apparent when reading the following description and referring to the accompanying drawing in which similar characters of reference represent corresponding parts in each of the several views.

Figure 1:
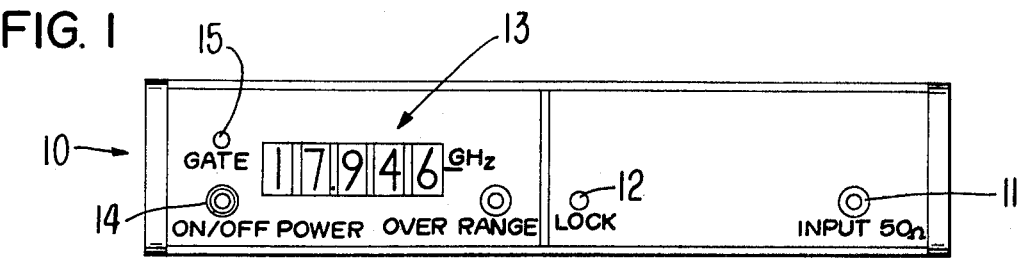
FIG. 1 is a front view of an instrument embodying the present invention.

Referring now to the drawing, with particular reference to FIG. 1, the panel of an automatic frequency meter 10 constructed in accordance with the present invention includes principally an input 11 and a readout 13. The input 11 is shown for receiving a coaxial connector which can be locked in place with a lock 12, and the readout 13 is shown as a digital readout display such as a five-tube Nixie tube display reading in GHz. The instrument panel also simply includes an on-off power switch 14, a panel light 15 flickering during operation and a range light for indicating that the signal is over range.

Figure 2:
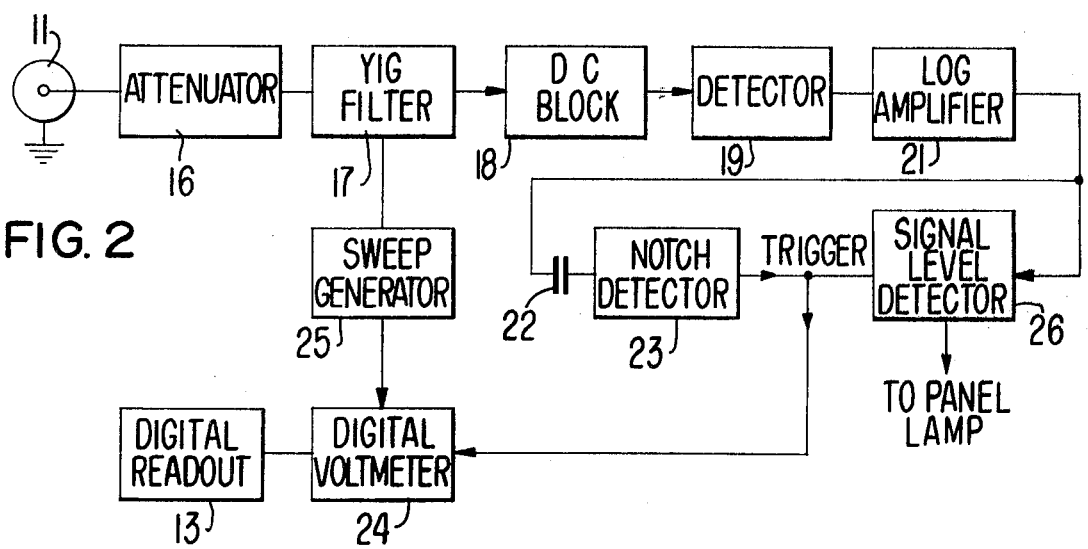
FIG. 2 is a block diagram view of the circuit element of the instrument of FIG. 1.

Referring to FIG. 2 showing the basic circuit elements of the instrument, the input signal is first attenuated in an attenuator 16 and passed, such as via a coaxial line, to a resonant frequency structure such as a YIG filter assembly 17 wherein a YIG ferrimagnetic material is coupled to the line in an absorbtion mode. Typically, the attenuator 16 is a 10 dB attenuator which improves the input impedance at the absorbtion dip from a possible VSWR of 10:1 to a maximum of 2:1.

The YIG assembly 17 includes a ferrimagnetic material cavity, such as a YIG sphere or YIG sphere doped with suitable substances such as gallium, suitably positioned in a magnetic field which is electronically tunable to provide an electronically tunable absorbtive cavity to measure frequency. In the embodiment described and illustrated in the drawing, the YIG material is coupled lightly to the transmission line in a manner to be described in greater detail below and the output of the filter assembly 17 is connected to a DC block in both the inner and outer conductors for isolating the filter output from the tuning transients of the magnetic sweep voltages.

The RF signal coupled through the DC block 18 is rectified, such as in a diode detector 19, and amplified in a logarithmic amplifier 21. The logarithmic amplifier 21 normalizes the input signal, and the design of the amplifier is standard. Since the absorbtion filter always absorbs a fixed ratio of power independent of signal level and the log amplifier gives the same voltage output for a fixed ratio of power change, a normalized output signal is produced independent of input signal power level allowing operation over wide dynamic ranges without causing frequency readout shift.

The amplifier 21 is DC coupled so that an input signal adjusts its operating point depending upon the signal lever. For a CW signal, there is no coupling through an output capacitor 22 into the detector and display circuitry. However, when the filter assembly 17 is tuned past the CW signal, a fixed amount of power is absorbed thereby generating a voltage transient that can be passed through the capacitor 22 into a notch detection circuit 23. The notch detector 23, operating on the standardized voltage output from the log amplifier 21, detects the exact peak of the signal (i.e., the bottom of the absorbtion dip in power) and generates a standard video signal which triggers a reading of the YIG tuning voltage at that precise time. By operating exactly at the peak which coincides with the point of maximum absorbtion on the YIG filter, high accuracy and resolution are achieved. As shown, the triggered reading is in a digital voltmeter 24 of the voltage in a sweep generator 25 sweeping the magnetic field applied to the YIG.

In order to provide the maximum amount of rejection to any noise or power supply ripple on the tuning voltage from sweep generator 25, the measurement is made over a short time period. During this time, the sweep generator 25 ramp is still scanning so that the voltage measuring circuit 24 is actually integrating a ramp rather than a fixed level. By integrating the ramp, the output frequency is displaced by a fixed offset from the true frequency reading and by keeping the ramp slope constant over the entire frequency range, this offset can be conveniently calibrated out of the instrument. In this way calibration is independent of frequency. Without integration, the last digit can change so rapidly that readout resolution is significantly impaired.

A signal lever detector 26 connected to the log amplifier 21 and the notch detector 23 is connected to the panel light 15. Signal levels below the minimum signal threshold are indicated by all zeros on the display and signal levels above the operating dynamic range are indicated by the flashing panel light 15.

Figure 3:
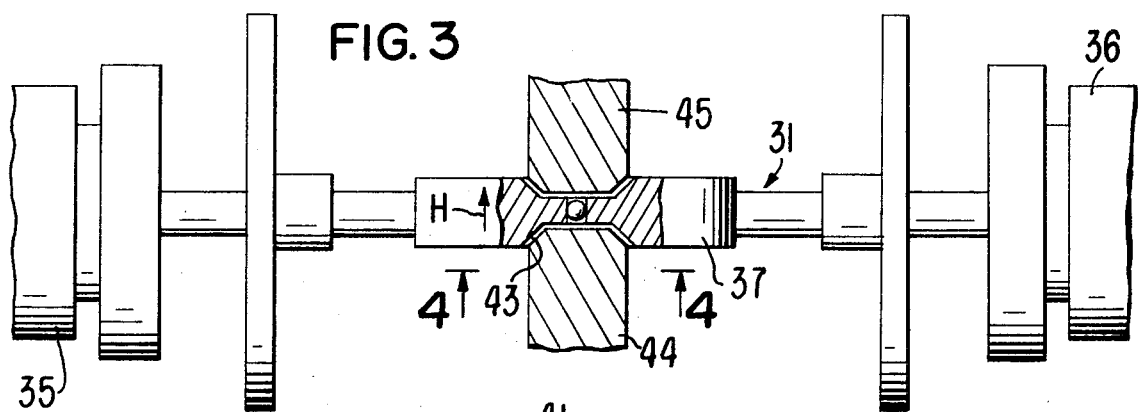
FIG. 3 is an enlarged elevational view, partially in section, of the YIG filter construction in accordance with one embodiment of the present invention.
Figure 4:
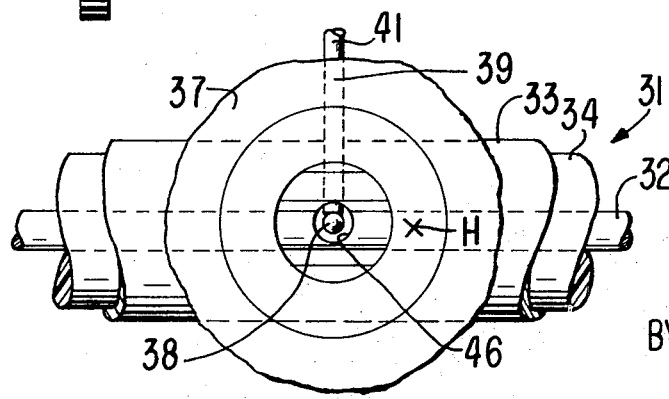
FIG. 4 is an enlarged view of a portion of the structure of FIG. 3 taken along line 4—4 in the direction of the arrows.

Referring now to FIGS. 3 and 4, there is shown the support assembly for the YIG member in the YIG filter assembly 17. The support assembly includes a coaxial line 31 having inner and outer conductors 32 and 33, respectively, separated by an insulating medium 34 such as Teflon with the ends of the coaxial line connected to connectors 35 and 36. A support plate 37, such as a disc-shaped member, is provided for supporting the YIG member for proper orientation of the coupling assembly and the sweeping magnetic field. The support plate 37 is provided with a bore passing therethrough in which the coaxial line 31 is supported and a perpendicularly oriented bore is provided for holding the YIG. The plate 37 is provided with pole piece recesses 42 and 43 for location of pole pieces 44 and 45, respectively, on opposite sides of the support plate 37. Pole pieces 44 and 45 are connected to a magnetic circuit (not shown) such as a solenoid for providing a magnetic field H across the coaxial line 31 where the YIG member 38 is located, and the field swept to sweep the resonant frequency of the YIG.

As shown in the enlarged view in FIG. 4, a semicircular slot 46 is cut into the center conductor 32 for the purpose of coupling the YIG sphere to the line 31 with a slot 46 directed perpendicular to the center conductor 32 and parallel with the direction of the magnetic field H. The YIG sphere 38 is bonded, such as by epoxy, on the end of an insulator 39, such as ceramic, connected to a support holder 41 and the holder 41 mounted in the support plate 37. Both the outer and center conductors can be directly machined in a semirigid coaxial cable.

It has been discovered with the YIG sphere 38 positioned in this slot 46 coupling is made directly to the 210 mode of the YIG with all other modes suppressed. This mode has a higher Q which allows high resolution frequency meters to be built and this mode is lower in frequency by almost 800 MHz (for pure YIG) which permits lower frequencies to be obtained for a given YIG material.

Figure 5:
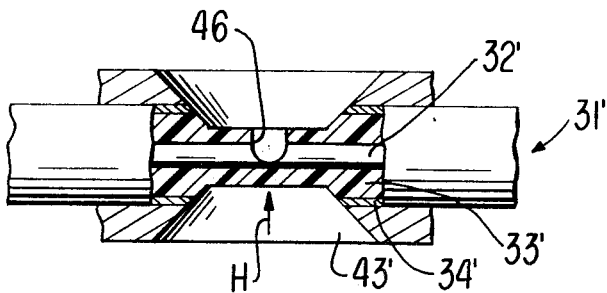
FIG. 5 is an enlarged view similar to FIG. 3 but showing an embodiment differing from the embodiment of FIGS. 3 and 4.

Alternatively, as illustrated in FIG. 5, the slot 47 is cut perpendicular to the magnetic field H thus coupling to the 110 mode of the YIG and suppressing other modes. This coupling structure permits stronger coupling and a more temperature stable coupling than that shown in FIGS. 3 and 4.

A microwave frequency meter of the type described can have an accuracy of about 1 part in $10^3$ and above 1 GHz there is little need for better accuracy.

In one automatic digital frequency meter constructed in accordance with the present invention utilizing a 10 mil diameter YIG, the frequency range of 3.7 to 18.0 GHz is covered with the range extended therebelow at input levels below −10 dBm. Frequency accuracy over the entire range is typically better than 0.1 percent (particularly above 8 GHz) and the five digit Nixie tube readout provides a ±1 MHz digital resolution for measuring fine frequency variations. Five readings per second are taken. Each measurement is made over 16.1 milliseconds so that with the integrating voltmeter to measure over a complete 60 Hz, the last digit in the five digit display remains constant to make the 1 MHz resolution possible.

Figure 6:
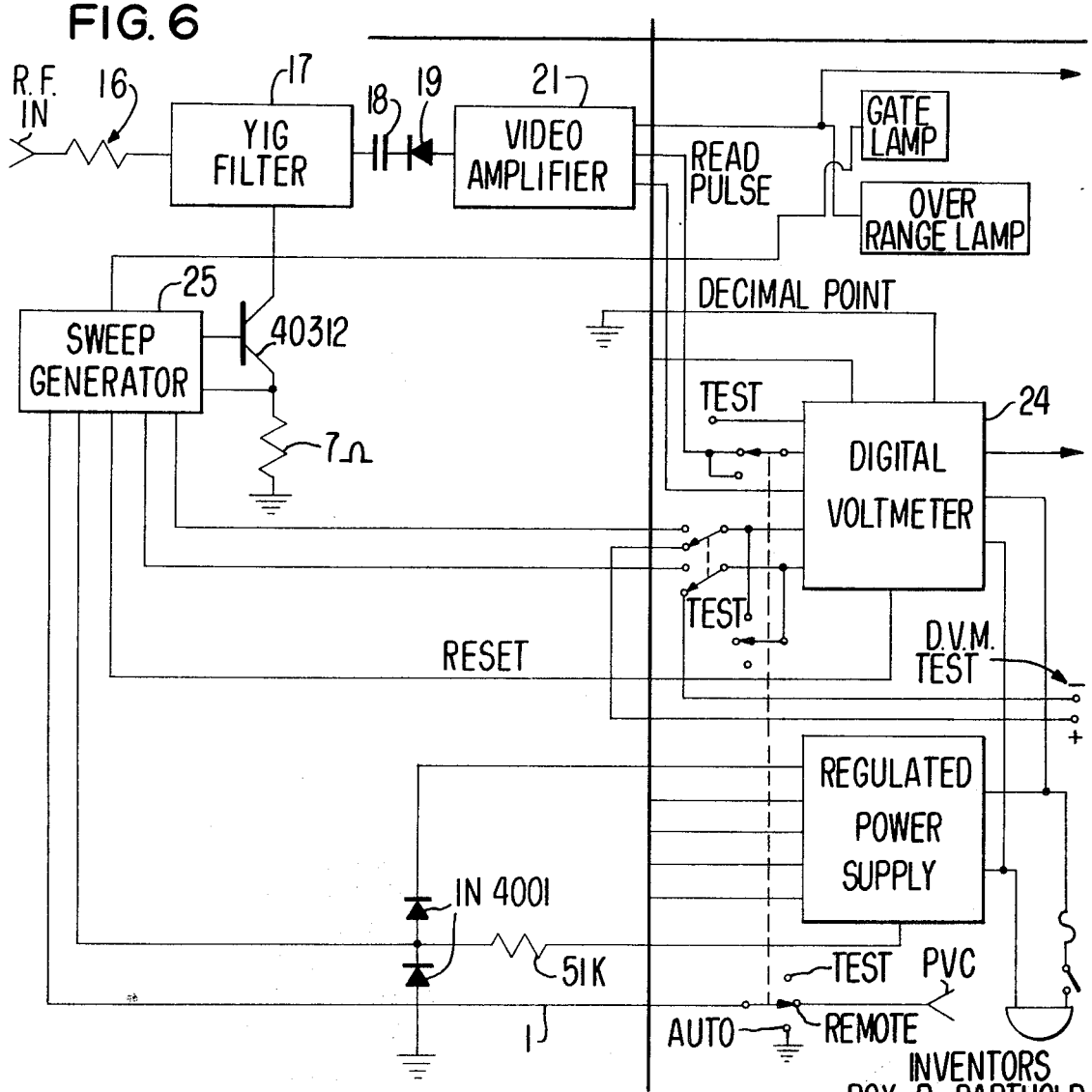
FIGS. 6, 7 and 8 circuit drawings showing the construction of one embodiment of the present invention.
Figure 7:
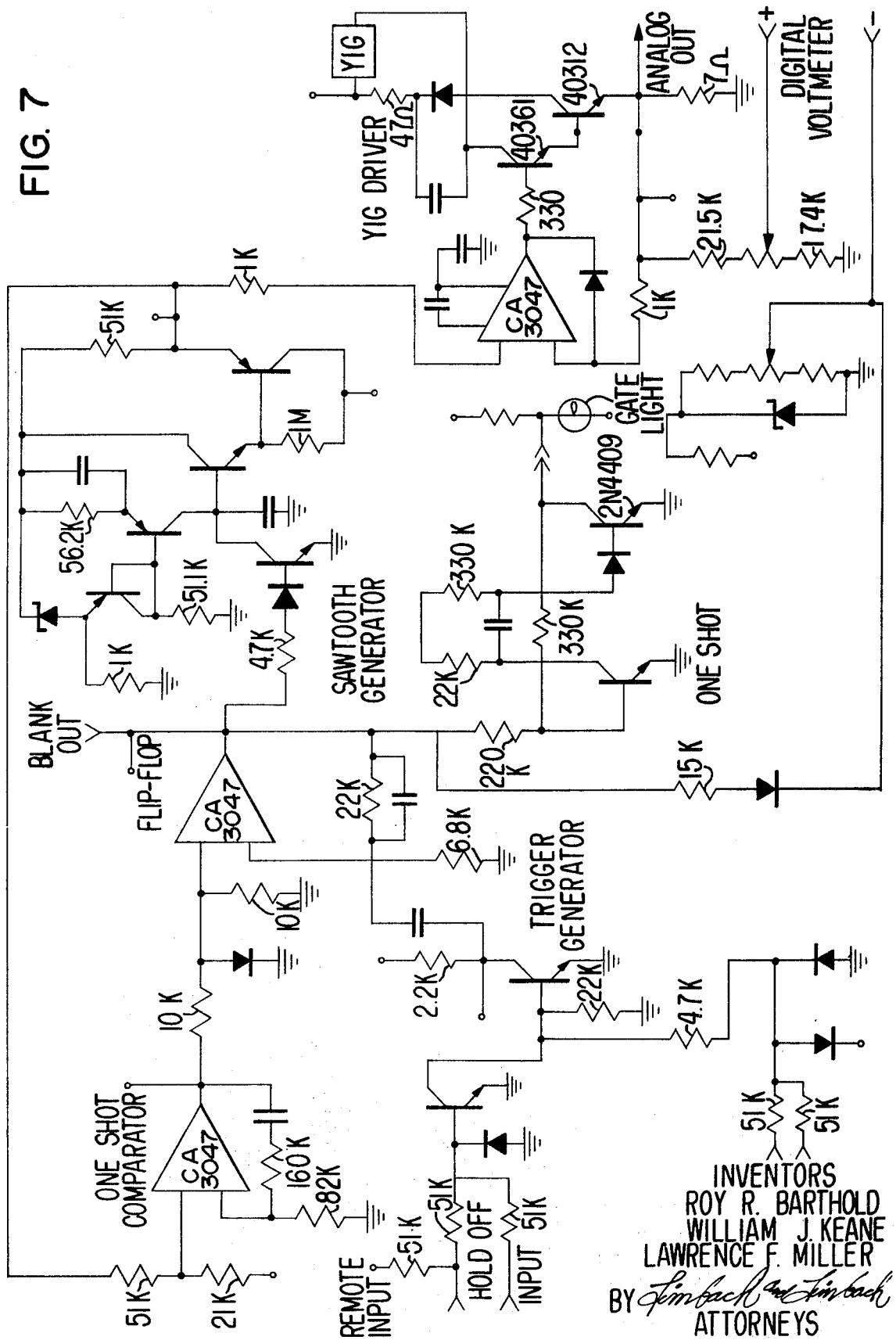

A specific illustration of the wiring connections between the circuit elements of the assembly is illustrated in FIG. 6. FIG. 7, including illustrative element values, shows a sweep generator circuit for sweeping the magnetic field applied to the YIG.

Figure 8:
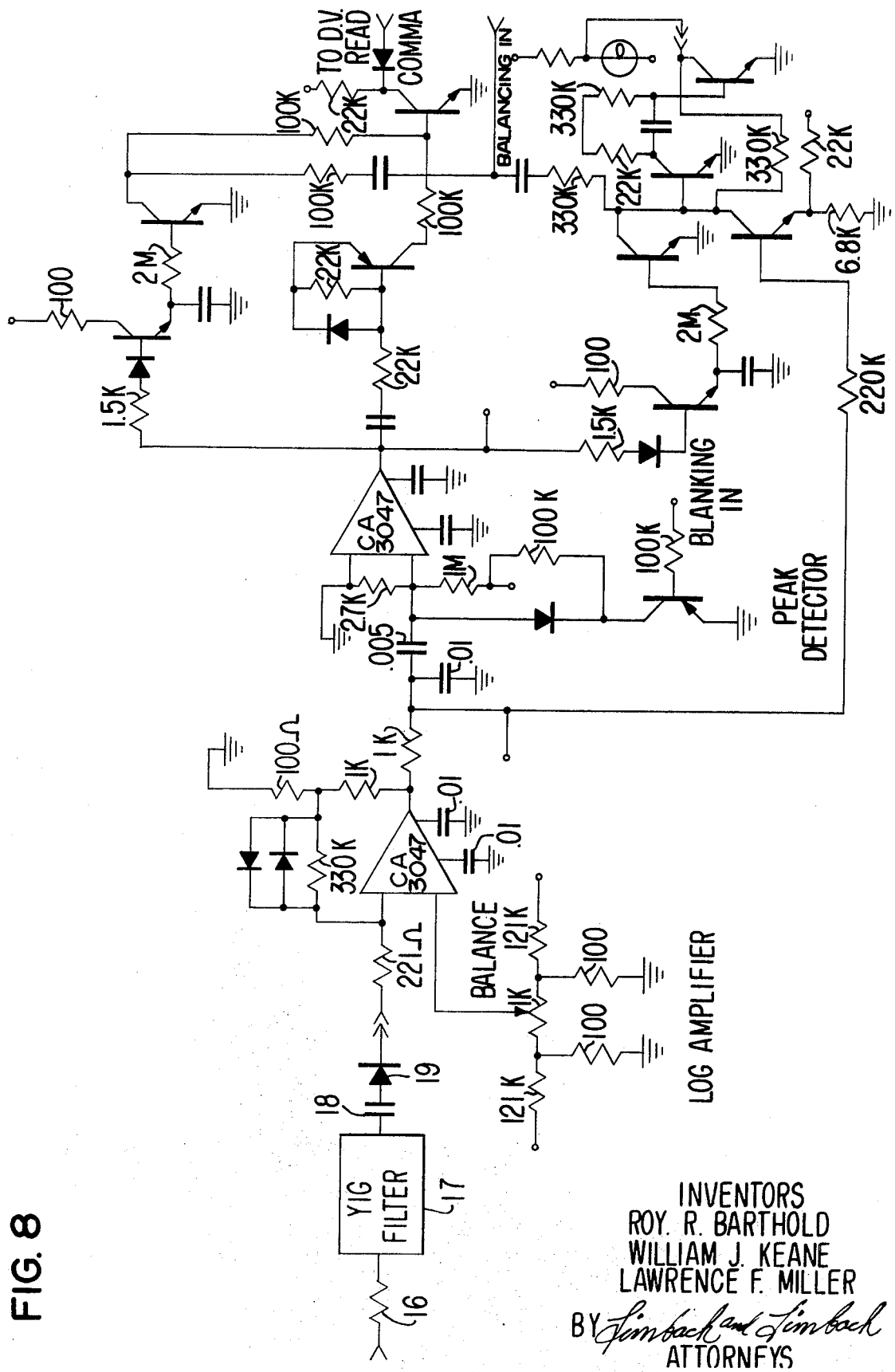

FIG. 8 shows a circuit arrangement useful for the log amplifier 21 and notch detector 23 shown in FIG. 2.

Although the instrument does not provide a few cycle accuracy provided by currently available automatic counters, it does provide a frequency measurement capability that satisfies the accuracy and resolution requirements for the great majority of microwave applications. It has a higher sensitivity, a wider frequency range, no susceptability to signal FM and greater operating convenience unavailable in other instruments at substantially greater cost.

The coupling construction can be utilized in band reject filters other than in an automatic frequency meter.

An extremely broad range is accomplished utilizing the frequency meter of this invention although a multistage filter sweeping through successive bands with different YIG spheres could be employed, but such multistage filters would involve the attendant tracking problems between YIG structures.

While an absorbtion type mode operation is described, a transmission type YIG filter could be utilized wherein the signal passes through the YIG filter. However, the absorbtion type cavity filter has a big advantage since the absorbtion type cavity always absorbs a fixed ratio of power from the signal independent of signal level.

While the YIG resonant frequency has been described and illustrated as determined by measuring the voltage in the sweep generator with an integrating digital voltmeter so that successive sweeps of the same frequency read the same to 1 MHz, other frequency measuring techniques can be used. For example, the time difference between the point at which the sweep is initiated and the time that the trigger is generated can be determined. By making a very linear voltage sweep, this time difference is directly proportional to frequency.

The instrument described is specific in design for measurement of CW frequencies but measurement of the frequency of pulse signals is also possible. This involves slowing the sweep rate or decreasing the sweep deviation.

Although the foregoing invention has been described in some detail by way of illustration and example for purposes of clarity of understanding, it is understood that certain changes and modifications may be practiced within the spirit of the invention as limited only by the scope of the appended claims.

We claim:
1. An automatic frequency meter comprising:
   a transmission line for carrying a signal to be measured,
   a sphere of yttrium-iron-garnet having resonant frequency,
   means for continuously sweeping the resonant frequency of said sphere across a band of frequencies,
   a coaxial conductor coupling means for coupling said sphere to said transmission line and having a center conductor with a slot therein, means for positioning said sphere adjacent said slot in said center conductor, said sweeping means including means applying a changing magnetic field perpendicular to the axis of said center conductor, means for detecting a change in the level of the signal from said transmission line, means for determining the resonant frequency of said structure from the sweeping means with a detected change in said output signal, and means for indicating the frequency of the input signal corresponding to the determined resonant frequency of said structure.

2. The frequency meter of claim 1 wherein said slot of said center conductor is aligned with the major axis thereof parallel to the direction of said magnetic field for coupling to the 210 mode of said yttrium-iron-garnet.

3. The frequency meter of claim 1 wherein said slot of said center conductor is aligned with the major axis thereof perpendicular to the direction of said magnetic field for coupling to the 110 mode of said yttrium-iron-garnet.

4. An automatic frequency meter comprising:

a coaxial transmission line for carrying the signal to be measured;

yttrium-iron-garnet material, means for applying a continuously sweeping magnetic field to said material for sweeping the resonant frequency of said material across a bond of frequencies containing the signal frequency, means for coupling said material to said coaxial line for absorption of signal energy by said material from said line when the resonant frequency of said material is swept past the frequency of the signal, means for detecting the signal conducted on said line past said coupling means, logarithmic amplifier means for amplifying the detected signal, means for detecting occurrence of the maximum change of the signal on said line due to absorption by said material, means for determining from the sweeping means the resonant frequency of said material at occurrence of said maximum change, means for indicating the frequency of the signal corresponding to the determined resonant frequency of said structure, said magnetic field being directed perpendicular to the center conductor of said coaxial line, said coupling means including a slot in the center conductor of said coaxial line aligned parallel with the direction of said magnetic field, and means for positioning said structure adjacent to said slot for coupling to the 210 mode of said structure.

5. An automatic frequency meter comprising:

a coaxial transmission line for carrying the signal to be measured, yttrium-iron-garnet material, means for applying a continuously sweeping magnetic field to said material for sweeping the resonant frequency of said material across a band of frequencies containing the signal frequency, means for coupling said material to said coaxial line for absorption of signal energy by said material from said line when the resonant frequency of said material is swept past the frequency of the signal, means for detecting the signal conducted on said line past said coupling means, logarithmic amplifier means for amplifying the detected signal, means for detecting occurrence of the maximum change of the signal on said line due to absorption by said material, means for determining from the sweeping means the resonant frequency of said material at occurrence of said maximum change, means for indicating the frequency of the signal corresponding to the determined resonant frequency of said structure, said magnetic field being directed perpendicular to the center conductor of said coaxial line, said coupling means including a slot in the center conductor of said coaxial line aligned perpendicular to the direction of said magnetic field, and means for positioning said structure adjacent said slot for coupling to the 110 mode of said structure.

* * * * *